United States Patent
Oda et al.

[11] Patent Number: 5,820,975
[45] Date of Patent: Oct. 13, 1998

[54] SOUND ABSORBING MATERIAL AND METHOD OF PRODUCTION THEREFOR

[75] Inventors: Katsutoshi Oda, Kawasaki; Toshiyuki Suzuki, Kisarazu; Masao Imanishi, Hamamatsu; Akira Kaneko, Hamamatsu; Kenji Ito, Hamamatsu; Yasutaka Nakamura, Hamamatsu, all of Japan

[73] Assignee: Nippon Steel Chemical Co., Ltd., Japan

[21] Appl. No.: 725,680

[22] Filed: Oct. 2, 1996

[30] Foreign Application Priority Data

Oct. 4, 1995 [JP] Japan .................... 7-257889

[51] Int. Cl.$^6$ ................ D21H 5/18; B32B 7/02
[52] U.S. Cl. .......... 428/219; 428/304.4; 428/306.6; 428/307.3; 428/316.6; 428/317.1; 428/317.7; 428/318.4; 428/323; 428/332; 162/145; 162/181.7
[58] Field of Search .............. 428/219, 304.4, 428/306.6, 307.3, 316.6, 317.1, 317.7, 318.4, 323, 332; 162/145, 181.7, 204, 222, 225; 252/62

[56] References Cited

U.S. PATENT DOCUMENTS 5,071,511  12/1991  Pittman .................... 162/145

FOREIGN PATENT DOCUMENTS 63-60172   3/1988   Japan .
5-204385   8/1993   Japan .
5-273984  10/1993   Japan .

*Primary Examiner*—Richard Weisberger
*Attorney, Agent, or Firm*—Ostrolenk, Faber, Gerb & Soffen, LLP

[57] ABSTRACT

A sound absorbing material which comprises a base layer 1 having a porosity of 5 to 50% by volume and a decorative layer 3 having a porosity of 5 to 50% by volume integrally, and which is obtained by sprinkling inorganic particles 4 containing colored particles in an amount of at least 1% by volume which are coated with a weather-resistant transparent resin so as to form a first particle layer which is to form the decorative layer 3 in the sound absorbing material, sprinkling uncolored inorganic lightweight particles 2 which are coated with a thermosetting resin on the first particle layer so as to form a second particle layer which is to form the base layer 1 in the sound absorbing material, and carrying out thermal compression integral molding of the first particle layer and the second particle layer simultaneously, is lightweight and inexpensive, and is provided with an attractive external stone-grain-like appearance, without impairing the sound absorbing ability of the material. In addition, by placing a reinforcing layer material on the top surface, bottom surface, or both surfaces of the second particle layer, and carrying out thermal compression integral molding of the first particle layer, the second particle layer, and the reinforcing layer material(s) simultaneously, it is possible to provide a sound absorbing material which is provided with rigidity to enable the material to be free-standing, without impairing the above advantages and the sound absorbing ability of the material.

6 Claims, 5 Drawing Sheets

SOUND ABSORBING MATERIAL AND METHOD OF PRODUCTION THEREFOR

BACKGROUND OF THE INVENTION

1. Field of the Invention

The present invention relates to a lightweight and inexpensive sound absorbing material which is provided with an attractive external stone-grain-like appearance without impairment to the sound absorbing ability of the material, and to a method of production therefor.

Further, the present invention relates to a sound absorbing material which has been provided with rigidity through the disposition of a reinforcing layer to enable the material to be free-standing, without impairing the sound absorbing effects or ability of the material.

2. Description of the Related Art

Fiber-based porous sound absorbing materials in which stone-pattern-printed decorative paper is adhered to a fiber material like fiber glass or rock wool are well known examples of this type of sound absorbing material. Additionally, Japanese Patent Application, First Publication, Sho 63-60172 and Japanese Patent Application, First Publication, Hei 5-204385 propose a sound absorbing material in which inorganic particles such as foundry sand or ceramic particles are adhered together using a thermosetting resin, and molded to form an integral structure.

However, these fiber-based porous sound absorbing materials are problematic in that, due to the soft surface, denting may occur upon depression. Moreover, in order to avoid loss of the sound absorbing capabilities, it is necessary to provide air holes in the stone-pattern-printed decorative paper. The presence of these air holes detracts from the external appearance of the material, so that the material is not satisfactory with regard to its decorative appeal. Additionally, a material having a density of 0.1 g/cm$^3$, which is in the range in which the rate of sound absorption is excellent, lacks rigidity, so that it becomes necessary to provide a reinforcing member such as a support plate. Accordingly, it is not possible to use the sound absorbing material in a free-standing manner.

Moreover, in the case of a sound absorbing material in which inorganic particles are adhered together using a thermosetting resin and molded to form an integral structure, it is not possible to obtain an external stone-grain-like appearance from the inorganic particles due to color which is inherent in the thermosetting resin. Further, since inorganic particles are used as the main component, the sound absorbing material becomes heavy, while cutting or other working processes carried out on the material become difficult. In addition, the material lacks sufficient strength and rigidity, so that it cannot be used in a free-standing manner.

In order to resolve the problem of insufficient strength and rigidity in the material, a sound absorbing material was proposed in Japanese Patent Application, First Publication, Hei 5-273984 in which a reinforcing member consisting of a fiber material is adhered to the top and bottom surfaces of a sound absorbing material consisting of the above-described inorganic particles.

However, this sound absorbing material does not have sufficient decorative appeal and involves a more complicated production process due to the addition of a step to adhere the reinforcing member.

SUMMARY OF THE INVENTION

The present invention was conceived in consideration of the aforementioned circumstances and has as its object the provision of a lightweight, inexpensive sound absorbing material which is provided with an attractive stone-grain-like external appearance without impairing the sound absorbing ability of the material. It is also an object of the present invention to provide a method of production for this sound absorbing material.

In addition, it is an object of the present invention to provide a sound absorbing material which is provided with rigidity, enabling the material to be free-standing without impairing the sound absorbing effects or ability thereof, and to provide a method of production therefor.

In order to resolve the aforementioned problems, the present invention provides a method of producing a sound absorbing material comprising the steps of:

sprinkling inorganic particles containing colored particles in an amount of at least 1% by volume which are coated with a weather-resistant transparent resin so as to form a first particle layer which is to form a decorative layer in the sound absorbing material;

sprinkling uncolored inorganic lightweight particles which are coated with a thermosetting resin on the first particle layer so as to form a second particle layer which is to form a base layer in the sound absorbing material; and carrying out thermal compression integral molding of the first particle layer and the second particle layer simultaneously.

In addition, in the above method of producing a sound absorbing material, a reinforcing layer material in which a fibrous reinforcing member is impregnated with a resin may be placed on a top surface of the second particle layer which faces the first particle layer, a bottom surface of the second particle layer which faces opposite to the first particle layer, or both, and thermal compression integral molding of the first particle layer, the second particle layer, and the reinforcing layer material(s) is carried out simultaneously.

Accordingly, the first aspect of the present invention provides a sound absorbing material comprising a base layer having a porosity of 5 to 50% by volume and a decorative layer having a porosity of 5 to 50% by volume which is provided integrally on the base layer, wherein the base layer contains uncolored inorganic lightweight particles adhered together by means of a thermosetting resin, and wherein the decorative layer contains inorganic particles adhered together by means of a weather-resistant transparent resin, the inorganic particles containing colored particles in an amount of at least 1% by volume.

The second aspect of the present invention provides a sound absorbing material according to the first aspect of the present invention, wherein a reinforcing layer is provided on a top surface of the base layer which faces the decorative layer, a bottom surface of the base layer which faces opposite to the decorative layer, or both.

By sprinkling inorganic particles containing colored particles in an amount of at least 1% by volume which are coated with a weather-resistant transparent resin so as to form a first particle layer which is to form a decorative layer in the sound absorbing material, sprinkling uncolored inorganic lightweight particles which are coated with a thermosetting resin on the first particle layer so as to form a second particle layer which is to form a base layer in the sound absorbing material, and carrying out thermal compression integral molding of the first particle layer and the second particle layer simultaneously according to the present invention, it is possible to provide a lightweight, inexpensive sound absorbing material which is provided with an attractive stone-grain-like external appearance, without loss of the sound absorbing ability or weather resistance of the material, and to provide a method of production therefor.

In addition, by placing a reinforcing layer material on the top surface, bottom surface, or both surfaces of the second particle layer, and carrying out thermal compression integral molding of the first particle layer, the second particle layer, and the reinforcing layer material(s) simultaneously, it is possible to provide a sound absorbing material which is provided with rigidity to enable the material to be free-standing, without impairing the above advantages and the sound absorbing ability of the material.

DESCRIPTION OF THE PREFERRED EMBODIMENTS

Figure 1:
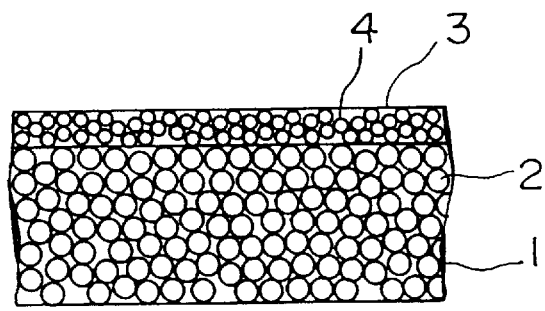
FIG. 1 is a cross-sectional view showing an example of the sound absorbing material according to the first aspect of the present invention.

FIG. 1 shows an example of the sound absorbing material according to the first aspect of the present invention. In the figure, a base layer 1 is formed by binding uncolored inorganic lightweight particles 2 using a thermosetting resin. A decorative layer 3 is provided in an integral fashion on top of the base layer 1. This decorative layer 3 is formed by bonding inorganic particles 4 that contain colored particles in the amount of at least 1% by volume using a weather-resistant transparent resin.

Base layer 1 and decorative layer 3 are adhered in an integral manner by the resins forming each of these layers, to form the sound absorbing material.

Pumiceous forms of natural rocks such as obsidian, perlite, koukaseki rock (a rhyolitic cellular lava originating from Niijima Island of the Izu Seven Islands, Japan, which is a fire-resistant glassy porous pumice of light gray or light red useful in civil engineering and construction), shirasu, or the like, or pumiceous forms of glass or various ceramics, having a particle diameter of 0.1 to 2 mm, may be employed as the uncolored inorganic lightweight particles 2 which are the main component of the base layer 1. The term "pumiceous" herein indicates a solid structure of an inorganic material characterized by numerous small cavities presenting a spongy, frothy appearance. A material having a bulk specific gravity of 0.05 to 1.0 g/cm$^3$ is suitable. When the bulk specific gravity is below 0.05 g/cm$^3$, the particle strength is not sufficient, while when the bulk specific gravity exceeds 1.0 g/cm$^3$, the sound absorbing material becomes heavy.

Phenol resin, melamine resin, unsaturated polyester resin, epoxy resin or the like may be employed as the thermosetting resin for binding the inorganic lightweight particles 2.

Natural rock, sand or ceramic particles having a particle diameter of 0.1 to 2 mm may be employed as the inorganic particles 4 which are the main component of the decorative layer 3. The inorganic particles 4 employed contain colored particles in the amount of at least 1% by volume. A thermoplastic resin or thermosetting resin having excellent weather resistance may be employed as the weather-resistant transparent resin for binding the inorganic particles 4. More specific examples thereof include acrylic resins, polyester resins, melamine resins, epoxy resins and the like. The term "weather resistance" or "weather-resistant" as used in the present invention indicates the absence of discoloration, changes in transparency or changes in gloss after 100 hours of exposure to light in a color fastness test ("Test for Resistance to Accelerated Weathering of Colored Plastic Material" according to Japanese Industrial Standard (JIS) K7102) using a UV carbon sunshine weatherometer.

Further, base layer 1 and decorative layer 3 of the sound absorbing material are porous, having numerous tiny pores therein, so as to permit the passage of air. The porosity for each of these layers is in the range of 5 to 50% by volume, and preferably in the range of 15 to 40% by volume. When the porosity is less than 5% by volume, it is not possible to obtain sufficient sound absorbing ability, while when the porosity exceeds 50% by volume, the strength of the sound absorbing material itself declines.

The thickness of the base layer 1 may be ordinarily in the range of 5 to 50 mm, while the thickness of the decorative layer 3 may be in the range of 1 to 5 mm. Accordingly, the thickness of the sound absorbing material may be in the range of 6 to 55 mm.

The sound absorbing material of this example is porous, having numerous extremely small pores inside the base layer and decorative layer, so that the passage of air therethrough is permitted. As a result, this sound absorbing material has excellent sound absorbing ability. Additionally, by varying the porosity of the base layer and decorative layer, it is possible to freely set the sound absorbing coefficient of the sound absorbing material. Further, by forming a decorative layer by binding inorganic particles that contain colored particles in the amount of at least 1% by volume using a weather-resistant transparent resin, it is possible to obtain a sound absorbing material which has the feel of inorganic particles and an attractive external stone-grain-like deep appearance in which there is no deterioration in the weather resistance of the material. Further, because uncolored inorganic lightweight particles are employed as the main component in the base layer, the sound absorbing material is lightweight and can be readily cut. In particular, if hollow particles or hollow pumiceous particles are employed as the inorganic lightweight particles, a thermal insulation effect can be obtained. Additionally, because inorganic particles and inorganic lightweight particles are the main components of the sound absorbing material, the material is highly non-flammable.

An explanation will now be made of an example of the method of production for the sound absorbing material shown in FIG. 1.

Step of Preparing Materials

Inorganic particles for forming the decorative layer which contain in the amount of at least 1% by volume colored particles adjusted to a specific particle diameter are heated to 80 to 200° C., and then introduced into a water-cooled stirring vessel. Stirring is initiated, after which an unset weather-resistant transparent resin in either liquid or powder form is added to coat the inorganic particles, to form the decorative layer particles. The amount of resin to be coated is in the range of 3 to 10% by weight with respect to the inorganic particles. When the amount to be coated is less than 3% by weight, the inorganic particles cannot sufficiently bind, while when the amount to be coated exceeds 10% by weight, it is not possible to assure a sufficient porosity in the decorative layer.

Base layer particles are formed in the same way, by coating uncolored inorganic lightweight particles which form the base layer with a thermosetting resin. The amount of resin to be coated is in the range of 3 to 10% by weight with respect to the inorganic lightweight particles. When the amount of resin to be coated is less than 3% by weight, the inorganic lightweight particles cannot sufficiently bind, while when the amount of resin to be coated exceeds 10% by weight, it is not possible to assure sufficient porosity in the base layer.

Forming and Molding Step

On a bottom metal plate for molding, the surface of which is coated with a mold releasing agent, the above-described decorative layer particles are sprinkled to an amount of 1 to 6 kg/m² so as to form a layer. The above-described base layer particles are then sprinkled on top of the decorative layer particles to an amount of 3 to 30 kg/m² so as to form another layer. The base layer particles are then covered with a top metal plate for molding, and the assembly is placed inside a hot press mold platen. Thermal compression integral molding is then carried out at 150° to 200° C. and 0.1 to 2 MPa for 5 to 30 minutes.

After releasing the pressure, the assembly is immediately removed and allowed to cool naturally. Once cooled, the molded layers are cut to prespecified dimensions.

The porosity in the decorative layer and base layer of this sound absorbing material may be varied by changing the particle diameter of the inorganic lightweight particles or the inorganic particles which are the main components of each of these layers. Alternatively, it is also effective to vary the amount of the decorative layer particles or the base layer particles sprinkled during formation.

In the above-described method of production for a sound absorbing material, the decorative layer particles and the base layer particles are sprinkled in layers, laminated, and undergo thermal compression integral molding simultaneously. As a result, it is not necessary to provide a decoration processing step, so that lower production costs can be realized.

Next, an example of the sound absorbing material of the second aspect of the present invention will be explained with reference being made to FIG. 2.

Figure 2:
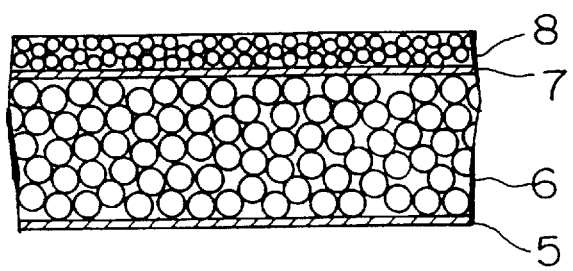
FIG. 2 is a cross-sectional view showing an example of the sound absorbing material according to the second aspect of the present invention.

The sound absorbing material shown in FIG. 2 differs from the sound absorbing material of the preceding example in the provision of reinforcing layers 5,7, in which a reinforcing layer material in the form of a prepreg prepared by impregnating a fibrous reinforcing member with a thermosetting resin and by partially setting the resin, is disposed to the top and bottom surfaces of the base layer particles, with the base layer particles and reinforcing layer material then undergoing thermal compression integral molding simultaneously.

In the above-described sound absorbing material, a base layer 6 is provided on top of a rear surface reinforcing layer 5 in which a fibrous reinforcing member has been preimpregnated with a thermosetting resin. A front surface reinforcing layer 7 formed in the same manner as rear surface reinforcing layer 5 is provided on top of base layer 6, with a decorative layer 8 provided on top of front surface reinforcing layer 7.

These layers are adhered by the resins which are the main components of each of these layers to form an integral structure, thereby obtaining the sound absorbing material.

It is noted here that the number and position of reinforcing layers 5 and 7 are not particularly limited. For example, a reinforcing layer 5 may be provided in the middle of the base layer.

Non-woven fabrics consisting of fiber glass, carbon fiber, synthetic fiber or the like, woven fabrics, knitted fabrics or the like may be employed for the fibrous reinforcing member. However, of these, glass cloth, glass mat or the like are preferred. The open lap of this fibrous reinforcing member is in the range of 5 to 80% of the surface area. When the open lap is less than 5%, it is not possible to obtain sound absorbing capabilities, while when the open lap exceeds 80%, sufficient rigidity cannot be provided to the sound absorbing material.

As a resin with which a fibrous reinforcing member may be impregnated, phenol resin, polyester resin, epoxy resin, melamine resin or the like may be employed in general. However, it is preferable to employ the same resin as that used for binding the base layer since the same state of binding can be obtained for each layer. Further, by employing the same resin, the conditions for production may be more easily set.

Because these reinforcing layers 5,7 are fibrous, they readily permit the passage of air. The porosity of these layers is in the range of 5 to 50% by volume, and preferably in the range of 15 to 40% by volume. When the porosity is less than 5% by volume, the sound absorbing ability of the material is impaired, while when the porosity exceeds 50% by volume, sufficient rigidity cannot be provided to the sound absorbing material.

By disposing a fibrous, air permeable reinforcing layer to the top and bottom surfaces of the base layer in the sound absorbing material of this example, rigidity can be provided to the sound absorbing material shown in FIG. 1, without impairing the sound absorbing effect or capability of the material. As a result, the sound absorbing material can be attached to the surface of a wall or the like in a free-standing manner.

Next, the method of production for the sound absorbing material shown in FIG. 2 will be explained.

Step of Preparing Materials

A fibrous reinforcing member is made into a prepreg by impregnating the member with a thermosetting resin in the amount of 20 to 50% by weight with respect thereto, and by partially setting the resin, to form a reinforcing layer material. This reinforcing layer material is then cut to prespecified dimensions.

The temperature for setting the resin when preparing the prepreg is around 100° C. in the case where a phenol resin is used, for example.

Forming and Molding Step

On a bottom metal plate for molding, the surface of which is coated with a mold releasing agent, a decorative layer particles are sprinkled so as to form a layer. The above-described reinforcing layer material is disposed on top of these decorative layer particles, and base layer particles are then sprinkled on top of the reinforcing layer so as to form another layer. Next, the above-described reinforcing layer material is disposed on top of these base layer particles, and covered with a top metal plate for molding. The assembly is then placed in a hot press mold platen where thermal compression integral molding is carried out at 150° to 200° C. and 0.1 to 2 MPa for 5 to 30 minutes.

After releasing the pressure, the assembly is immediately removed and allowed to cool naturally. Once cooled, the molded layers are cut to prespecified dimensions.

The porosity in the reinforcing layers of this sound absorbing material may be varied by changing the proportion of the open lap in the fibrous reinforcing member which forms the reinforcing layer. Alternatively, it is also effective to vary the amount of the reinforcing layer material sprinkled at formation.

As in the case of the production method for the sound absorbing material shown in FIG. 1, because thermal compression integral molding is carried out in the above-described method of production for a sound absorbing material, it is possible to provide rigidity to the sound absorbing material without inviting higher production costs.

EXAMPLES

Using preferred embodiments of the present invention, a detailed explanation will now be made of the sound absorbing material according to the first aspect of the present invention.

Example 1

A sound absorbing material was prepared as described below.

Step of Preparing Materials

Ceramic particles and colored sand (particle diameter 0.3 to 0.5 mm) which form the decorative layer were heated to 160° C., and then introduced into a water-cooled stirring vessel. Stirring was initiated, after which an unset unsaturated polyester type powdered coating material were added, coating the ceramic particles and colored sand, to form the decorative layer particles. The blending ratio for the ceramic particles and colored sand was 60/40 (volume ratio), while the amount of the unsaturated polyester coating material to be coated was 5% by weight with respect to the ceramic particles and colored sand.

Next, a granulated pumiceous form of glass powder (particle diameter 0.3 to 1.2 mm, product name: G-light, manufactured by Sunlight Co., Ltd.) for forming the base layer was heated to 200° C., and coated with an unset novolak type phenol resin, to form base layer particles. The amount of the novolak type phenol resin to be coated here was 7% by weight with respect to the granulated pumiceous form of glass powder.

Forming and Molding Step

On a bottom metal plate for molding, the surface of which was coated with molding releasing agent, decorative layer particles were sprinkled to an amount of 2.5 kg/m$^2$ so as to form a layer. Base layer particles were sprinkled on top of the decorative layer particles to an amount of 4.0 kg/m$^2$ so as to form another layer. A top metal plate for molding was then placed on top of the base layer particles, and the assembly was placed inside a hot press mold platen. Thermal compression integral molding was then carried out at 170° C. and 2 MPa for 15 minutes.

The thus-obtained sound absorbing material had a thickness of 10 mm, while the porosity of the decorative layer and base layer were 50% and 30% by volume, respectively.

Example 2

A sound absorbing material was formed under the same conditions as set forth in Example 1, with the diameter of the ceramic particles and colored sand which form the decorative layer changed to be in the range of 0.3 to 1.0 mm. The porosity of the decorative layer was 30% by volume.

Example 3

A sound absorbing material was formed under the same conditions as set forth in Example 1, with a melamine resin employed in place of the polyester type coating material which coats the ceramic particles and colored sand for forming the decorative layer.

Example 4

A sound absorbing material was formed under the same conditions as set forth in Example 1, by changing the diameter of the granulated pumiceous form of glass powder which forms the base layer and changing the amount of the base layer particles to be sprinkled. Namely, base layer particles were formed using a granulated pumiceous form of slag (particle diameter: 0.3 to 1.2 mm, product name: U-light, manufactured by Ube Industries Ltd.), and a sound absorbing material was formed by setting the amount of the base layer particles to be sprinkled to 3.4 kg/m$^2$.

Examples 5–7

Sound absorbing materials were produced under the same conditions as set forth in Example 1 by varying the amount of base layer particles sprinkled to be 4.8 kg/m$^2$ (Example 5), 5.2 kg/m$^2$ (Example 6), and 5.6 kg/m$^2$ (Example 7). The porosity of each of these base layers was, respectively, 20% by volume, 15% by volume, and 7% by volume.

Comparative Example 1

Under the same conditions as set forth in Example 1, a sound absorbing material was formed using a novolak type resin which was transparent but not weather-resistant in place of unsaturated polyester type coating material for coating the ceramic particles and colored sand which forms the decorative layer.

Comparative Example 2

Under the same conditions as set forth in Example 1, base layer particles were formed using molding sand in place of the granulated pumiceous form of glass powder for forming the base layer, to produce a sound absorbing material in which the amount of base layer particles sprinkled was 12.8 kg/m$^2$.

The weights and frequency characteristics of the sound absorbing coefficients were measured, and weather resistance tests were carried out on the sound absorbing materials prepared as above in Examples 1 through 7 and Comparative Examples 1 and 2.

The weather resistance test was carried out by making a visual inspection of the stone-grain-like external appearance of the sound absorbing material after 500 hours under a weatherometer test. The frequency characteristics of the sound absorbing coefficient were measured using the reverberation chamber method (JIS A1409) in the situation when an air layer was not provided at the back of the sound absorbing material, and in the situation when a 60 mm air layer was provided at the back of the sound absorbing material.

Figure 3:
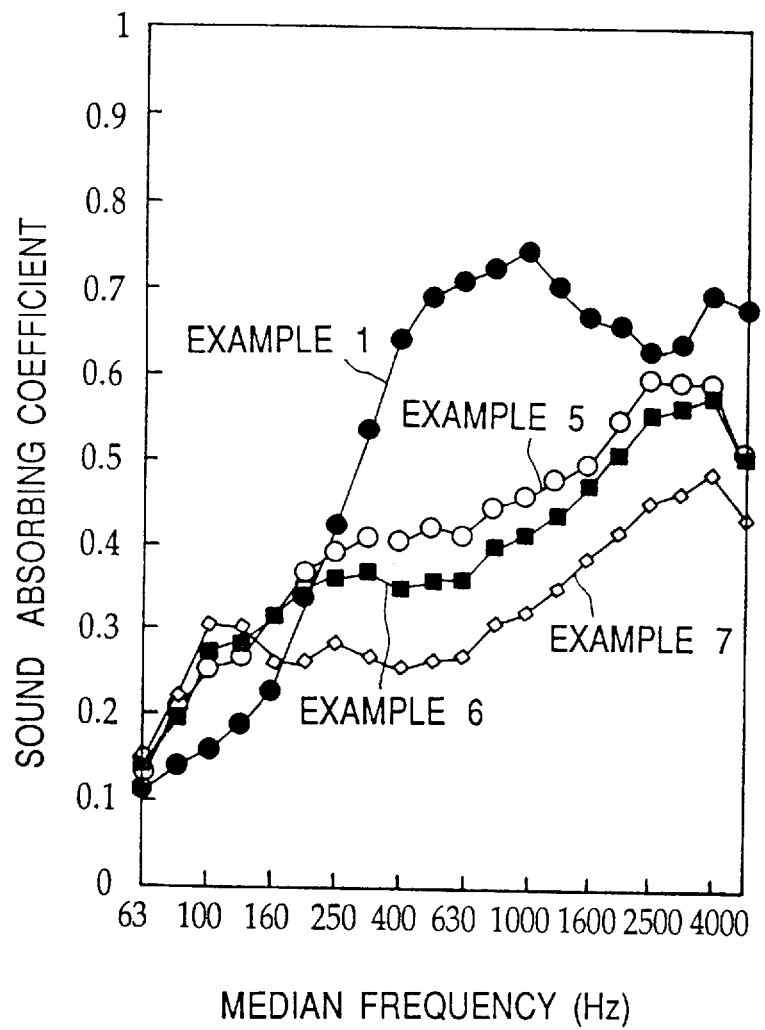
FIG. 3 is a graph showing the results of measurements of the frequency characteristics of the sound absorbing coefficient of the sound absorbing material according to the first aspect of the present invention.
Figure 4:
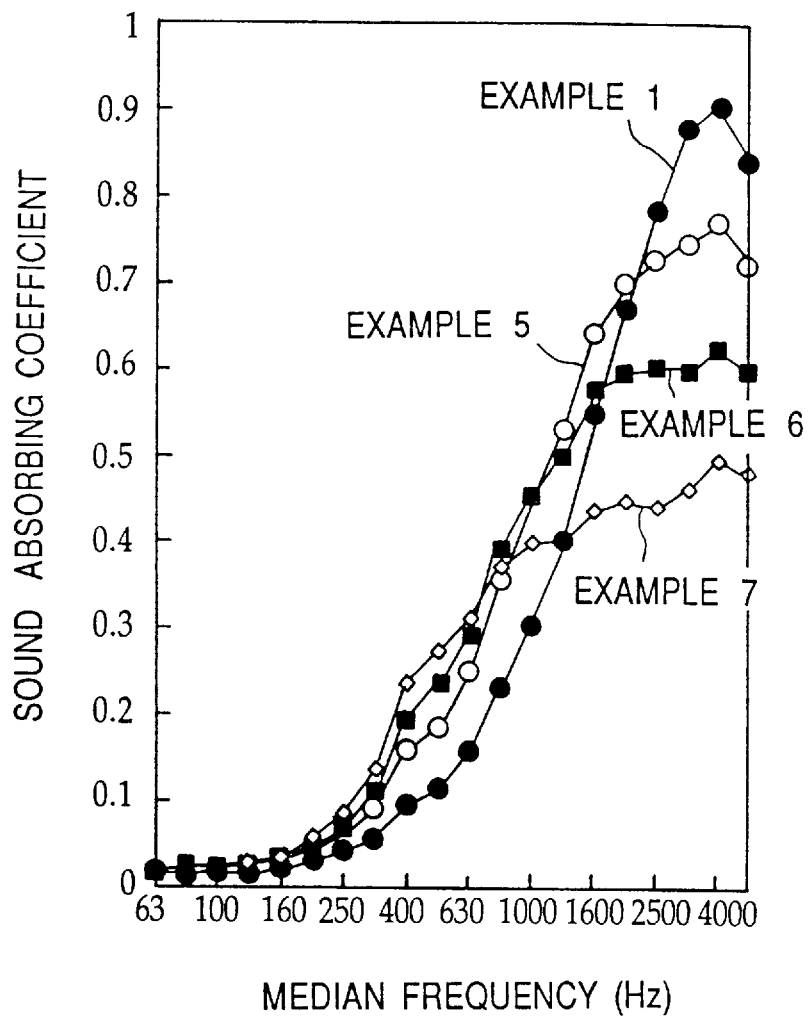
FIG. 4 is a graph showing the results of measurements of the frequency characteristics of the sound absorbing coefficient of the sound absorbing material according to the first aspect of the present invention.

The results of these measurements are shown in Table 1, and FIGS. 3 and 4.

Table 1 shows the results of the weather resistance test and the results of weight measurements for Examples 1 through 7 and Comparative Examples 1 and 2.

FIG. 3 shows the results of measurements of the frequency characteristics of the sound absorbing coefficient in the situation when an air layer was not provided at the back of the sound absorbing material. FIG. 4 shows the results of measurements of the frequency characteristics of the sound absorbing coefficient in the situation when a 60 mm air layer was provided at the back of the sound absorbing material. The results of measurements of the frequency characteristics of the sound absorbing coefficient of the sound absorbing materials prepared in Examples 2 though 4 were the same as the results obtained for the sound absorbing material prepared in Experiment 1. FIGS. 3 and 4 therefore show the results of measurements of the frequency characteristics of the sound absorbing coefficients for the sound absorbing materials prepared in Example 1 and Examples 5 through 7. In FIGS. 3 and 4, the symbols ●, ○, ■, and ◇ indicate results for Example 1 and Examples 5 through 7, respectively. In other words, by setting the amount of the base layer particles to be sprinkled to 4.0 kg/m$^2$, 4.8 kg/m$^2$, 5.2 kg/m$^2$ and 5.6 kg/m$^2$, the porosity of the base layers was varied to be 30%, 20%, 15% and 7% by volume, respectively, permitting an examination of the change in the frequency characteristics of the sound absorbing coefficients.

TABLE 1

| | stone-grain-like external appearance after weather resistance test | weight |
|---|---|---|
| Example 1 | excellent | 6.5 kg/m$^2$ |
| Example 2 | excellent | 6.5 kg/m$^2$ |
| Example 3 | excellent | 6.5 kg/m$^2$ |
| Example 4 | excellent | 5.9 kg/m$^2$ |
| Example 5 | excellent | 7.3 kg/m$^2$ |
| Example 6 | excellent | 7.7 kg/m$^2$ |
| Example 7 | excellent | 8.1 kg/m$^2$ |
| Comparative Ex. 1 | notable yellowing | 6.5 kg/m$^2$ |
| Comparative Ex. 2 | excellent | 15.3 kg/m$^2$ |

It may be understood from Table 1 that the sound absorbing materials prepared in Examples 1 through 7 of the present invention maintained an excellent stone-grain-like appearance following the weather resistance test. In contrast, the sound absorbing material prepared in Comparative Example 1, in which a novolak phenol resin which was transparent but not weather-resistant was employed as the resin for coating the inorganic particles which form the decorative layer, turned a noticeable yellow color following the weather resistance test. Accordingly, it may be understood that it is necessary to employ a weather-resistant transparent resin as the resin for coating the inorganic particles which form the decorative layer.

The weight of the sound absorbing material of Comparative Example 2, in which molding sand was employed as the main component of the base layer, was 1.9 to 2.6 fold greater than the weight of the sound absorbing materials of Examples 1 through 7. Accordingly, it is clear that by using inorganic lightweight particles as the main component of the base layer, the sound absorbing material can be made lighter in weight.

Further, from the results shown in FIGS. 3 and 4, it may be understood that a sound absorbing coefficient acceptable from the viewpoint of practical application of the sound absorbing material can be obtained when the porosity of the decorative layer is in the range of 7 to 30% by volume. Further, it is possible to set the sound absorbing coefficient by varying the amount of the base layer particles to be sprinkled.

An explanation will now be made of the sound absorbing material of the second aspect employing preferred embodiments thereof.

Example 8

Step of Preparing Materials

Ceramic particles and colored sand (particle diameter 0.3 to 0.5 mm) which form the decorative layer were heated to 160° C., and then introduced into a water-cooled stirring vessel. Stirring was initiated, after which an unset unsaturated polyester type powdered coating material was added, coating the ceramic particles and colored sand, to form the decorative layer particles. The blending ratio for the ceramic particles and colored sand was 60/40 (volume ratio), while the amount of the unsaturated polyester coating material to be coated was 5% by weight with respect to the ceramic particles and colored sand.

Next, a granulated pumiceous form of glass powder (particle diameter 0.3 to 1.2 mm, product name: G-light, manufactured by Sunlight Co., Ltd.) which forms the base layer was heated to 200° C., and coated with an unset novolak type phenol resin, to form base layer particles. The amount of the novolak type phenol resin to be coated here was 7% by weight with respect to the granulated pumiceous form of glass powder.

Glass cloth (product name: WLA-90C, manufactured by Nitto Boseki Co., Ltd.) for forming the reinforcing layer, having a thickness of 0.11 mm and an open lap comprising 23% of the surface area, was impregnated with a resin consisting of a 8:2 blending ratio of a resol type phenol resin and a novolak type phenol resin. The reinforcing layer material was obtained by forming a prepreg by partially setting the resin at 100° C. The resin impregnated in the glass cloth was present in the amount of 40% by weight with respect to the glass cloth.

Forming and Molding Step

On a bottom metal plate for molding, the surface of which was coated with a mold releasing agent, the above-described decorative layer particles are sprinkled to an amount of 2.5 kg/m$^2$ so as to form a layer. The above-described reinforcing layer material was disposed to an amount of 0.15 kg/m$^2$ on top of the decorative layer particles. Base layer particles were then sprinkled on top of the reinforcing layer particles to an amount of 4.0 kg/m$^2$ so as to form a layer. The above-described reinforcing layer material was then disposed on top of the base layer particles to an amount of 0.15 kg/m$^2$, and covered with a top metal plate for molding. The assembly was placed inside a hot press mold platen, and thermal compression integral molding was carried out at 170° C. and 2 MPa for 15 minutes.

The thus-obtained sound absorbing material had a thickness of 10 mm, while the porosity of the decorative layer, base layer and reinforcing layer were 50%, 30% and 50% by volume, respectively.

Examples 9 through 14 differ from Examples 2 through 7 in that a reinforcing layer material identical to that employed in Example 8 was disposed to the top and bottom surfaces of the base layer particles, with thermal compression integral molding then carried out.

Examples 9 through 14 correspond to Examples 2 through 7, respectively.

Comparative Example 3

Under the same conditions as set forth in Comparative Example 1, a reinforcing layer material prepared in the same way as in Example 8 was disposed to the top and bottom surfaces of the base layer particles, with thermal compression integral molding then carried out on these layers to obtain a sound absorbing material.

Comparative Example 4

Under the same conditions as set forth in Comparative Example 2, a reinforcing layer material prepared in the same way as in Example 8 was disposed to the top and bottom surfaces of the base layer particles, with thermal compression integral molding then carried out on the layers to obtain a sound absorbing material.

The weights and frequency characteristics of the sound absorbing coefficients were measured, and weather resistance tests were carried out on the thus-prepared sound absorbing materials of Examples 8 through 14 and Comparative Examples 3 and 4. Additionally, the flexural strength of the board and the elastic modulus were measured in the sound absorbing materials prepared in Example 8 and Example 1.

The weather resistance test and frequency characteristics of the sound absorbing coefficients were measured by the same methods as described above.

The measurements of the flexural strength of the board and the elastic modulus were made in accordance with JIS A5908, with measurements made on a board having a thickness of 10 mm.

Figure 5:
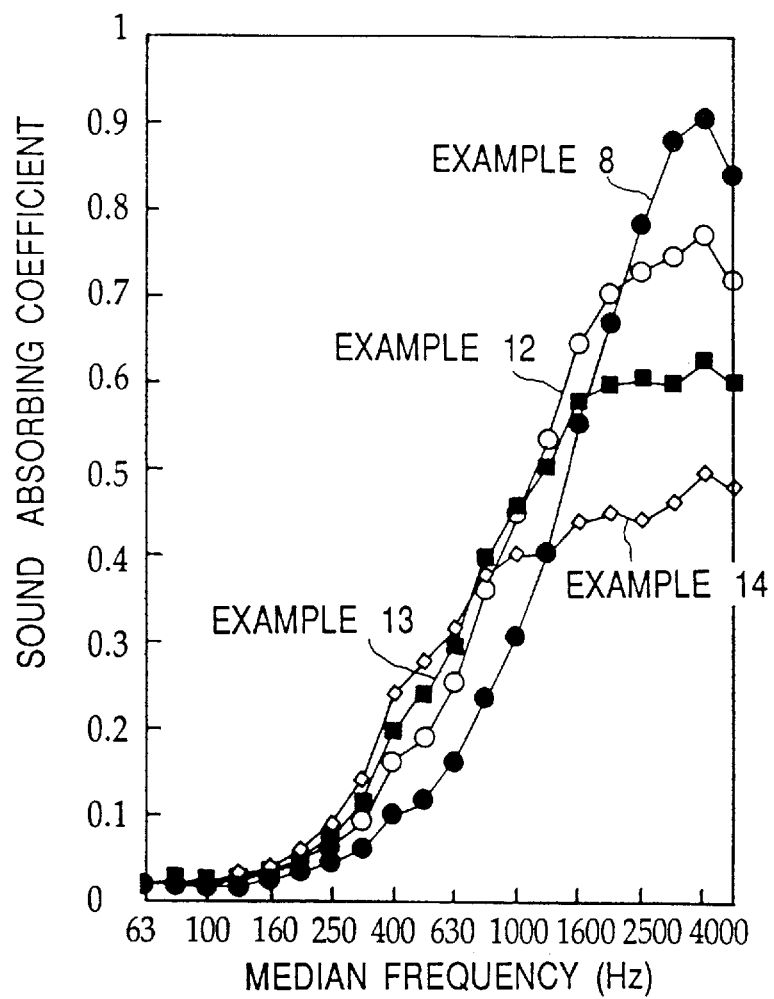
FIG. 5 is a graph showing the results of measurements of the frequency characteristics of the sound absorbing coefficient of the sound absorbing material according to the second aspect of the present invention.
Figure 6:
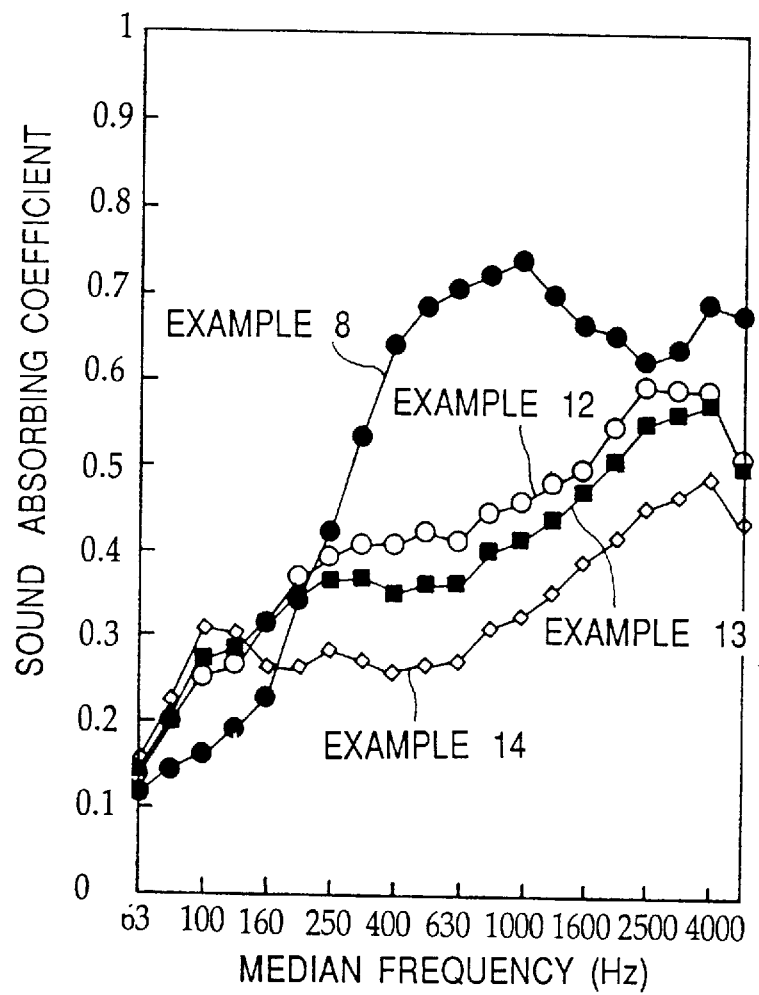
FIG. 6 is a graph showing the results of measurements of the frequency characteristics of the sound absorbing coefficient of the sound absorbing material according to the second aspect of the present invention.

The results of these measurements are shown in Tables 2 and 3 and FIGS. 5 and 6.

Table 2 shows the results of the weight measurements and the weather resistance test.

Table 3 shows the results of measurements of the flexural strength of the board and the elastic modulus.

FIG. 5 shows the results of measurements of the frequency characteristics of the sound absorbing coefficient in the situation when an air layer was not provided at the back of the sound absorbing material. FIG. 6 shows the results of measurements of the frequency characteristics of the sound absorbing coefficient in the situation when a 60 mm air layer was provided at the back of the sound absorbing material. The results of measurements of the frequency characteristics of the sound absorbing coefficients for the sound absorbing materials prepared in Examples 9 though 11 were the same as the results of measurements for the sound absorbing material prepared in Example 8. FIGS. 5 and 6 therefore show the results of measurements on the sound absorbing materials prepared in Example 8 and Examples 12 through 14. In FIGS. 5 and 6, the symbols ●, ○, ■, and ◇ indicate the results for Example 8 and Examples 12 through 14, respectively. In other words, by setting the amount of the base layer particles to be sprinkled to 4.0 kg/m$^2$, 4.8 kg/m$^2$, 5.2 kg/m$^2$ and 5.6 kg/m$^2$, the porosity of the base layers was varied to be 30%, 20%, 15% and 7% by volume, respectively, permitting an examination of the change in the frequency characteristics of the sound absorbing coefficients in each case.

TABLE 2

| | stone-grain-like external appearance after weather resistance test | weight |
|---|---|---|
| Example 8 | excellent | 6.8 kg/m$^2$ |
| Example 9 | excellent | 6.8 kg/m$^2$ |
| Example 10 | excellent | 6.8 kg/m$^2$ |
| Example 11 | excellent | 6.2 kg/m$^2$ |
| Example 12 | excellent | 7.6 kg/m$^2$ |
| Example 13 | excellent | 8.0 kg/m$^2$ |
| Example 14 | excellent | 8.4 kg/m$^2$ |
| Comparative Ex. 3 | notable yellowing | 6.8 kg/m$^2$ |
| Comparative Ex. 4 | excellent | 15.6 kg/m$^2$ |

TABLE 3

| | Example 8 | Example 1 |
|---|---|---|
| Density | 0.68 g/cm$^3$ | 0.65 g/cm$^3$ |
| Surface Density | 6.8 kg/m$^2$ | 6.5 kg/m$^2$ |
| Load at Flexural Elasticity Limit | 6.0 kfg | 1.8 kfg |
| Breaking Load by Bending | 16.2 kfg | 2.5 kfg |
| Flexural Strength | 95 kfg/cm$^2$ | 14 kfg/cm$^2$ |
| Flexural Elasticity | 18500 kfg/cm$^2$ | 11200 kfg/cm$^2$ |

From Table 2, it is clear that the sound absorbing materials prepared in Examples 8 through 14 according to the second aspect of the present invention maintained an excellent stone-grain-like external appearance even after the weather resistance test. Further, a comparison of the weights of the sound absorbing material of Examples 8 through 14 and the weight of the sound absorbing material of Comparative Example 4 clearly reveals that the sound absorbing materials of Examples 8 through 14 were lighter in weight.

From Table 3, it may be understood that the provision of a reinforcing layer material and subsequent thermal compression integral molding increased the strength of the sound absorbing material of Example 8, providing rigidity to the material enabling the sound absorbing material to be used in a free-standing manner.

Further, from the results shown in FIGS. 5 and 6, it may be understood that a sound absorbing coefficient acceptable from the viewpoint of practical application of the sound absorbing material can be obtained when the porosity of the decorative layer is in the range of 7 to 30% by volume. Further, it is possible to set the sound absorbing coefficient by varying the amount of the base layer particles to be sprinkled.

From the above results, it is clear that the sound absorbing materials of Examples 8 through 14 according to the second aspect of the present invention are provided with rigidity to enable the material to be free-standing, without impairing the sound absorbing effects or sound absorbing ability of the sound absorbing material according to the first aspect of the present invention.

Although the invention has been described in detail herein with reference to its preferred embodiments and certain described alternatives, it is to be understood that this description is by way of example only, and it is not to be construed in a limiting sense It is further understood that numerous changes in the details of the embodiments of the invention, and additional embodiments of the invention, will be apparent to, and may be made by, persons of ordinary skill in the art having reference to this description. It is contemplated that all such changes and additional embodiments are within the spirit and true scope of the invention as claimed.

What is claimed is:

1. A sound absorbing material comprising a base layer having a porosity of 5 to 50% by volume and a decorative layer having a porosity of 5 to 50% by volume which is provided integrally on the base layer, wherein the base layer contains uncolored inorganic particles adhered together by means of a thermosetting resin in the range of 3 to 10% by weight with respect to the inorganic particles, the inorganic particles having a specific gravity of 0.05 to 1 g/cm$^3$ and wherein the decorative layer contains inorganic particles adhered together by means of a weather-resistant transparent resin, the inorganic particles containing colored particles in an amount of at least 1% by volume.

2. A sound absorbing material according to claim 1, wherein a porous reinforcing layer is provided on a top surface of the base layer which faces the decorative layer.

3. A sound absorbing material according to claim 1, wherein a porous reinforcing layer is provided on a bottom surface of the base layer which faces opposite to the decorative layer.

4. A sound absorbing material according to claim 1, wherein a porous reinforcing layer is provided on each of a top surface of the base layer which faces the decorative layer and a bottom surface of the base layer which faces opposite to the decorative layer.

5. A method of producing a sound absorbing material comprising the steps of:

sprinkling inorganic particles containing colored particles in an amount of at least 1% by volume which are coated with a weather-resistant transparent resin so as to form a first particle layer which is to form a decorative layer in the sound absorbing material;

sprinkling uncolored inorganic particles which are coated with a thermosetting resin on the first particle layer so as to form a second particle layer which is to form a base layer in the sound absorbing material, the thermosetting resin being in the range of 3 to 10% by weight with respect to the inorganic particles and the inorganic particles having a specific gravity of 0.05 to 1 g/cm$^3$; and carrying out thermal compression integral molding of the first particle layer and the second particle layer simultaneously.

6. A method of producing a sound absorbing material comprising the steps of:

sprinkling inorganic particles containing colored particles in an amount of at least 1% by volume which are coated with a weather-resistant transparent resin so as to form a first particle layer which is to form a decorative layer in the sound absorbing material;

placing a first reinforcing layer material in which a fibrous reinforcing member is impregnated with a resin on the first particle layer;

sprinkling uncolored inorganic particles which are coated with a thermosetting resin on the first reinforcing layer material so as to form a second particle layer which is to form a base layer in the sound absorbing material, the thermosetting resin being in the range of 3 to 10% by weight with respect to the inorganic particles and the inorganic particles having a specific gravity of 0.05 to 1 g/cm$^3$; and placing a second reinforcing layer material in which a fibrous reinforcing member is impregnated with a resin on the second particle layer; and carrying out thermal compression integral molding of the first particle layer, the first reinforcing layer material, the second particle layer, and the second reinforcing layer material simultaneously.

* * * * *